Figure 1A:
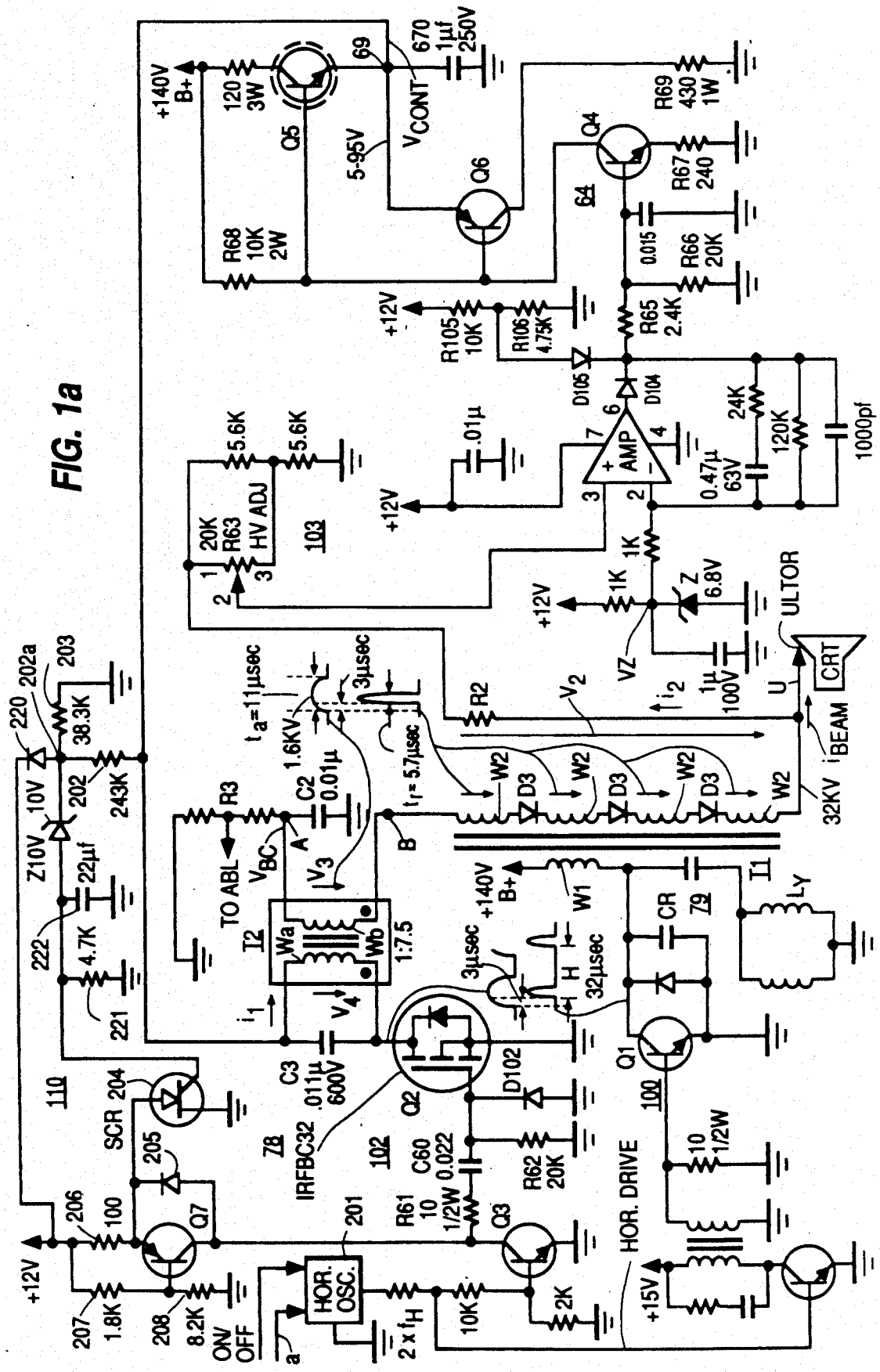

United States Patent [19]

Fernsler et al.

[11] Patent Number: 5,047,698
[45] Date of Patent: Sep. 10, 1991

[54] HIGH VOLTAGE SHUTDOWN CIRCUIT

[75] Inventors: Ronald E. Fernsler; Kevin M. Williams, both of Indianapolis, Ind.

[73] Assignee: Thomson Consumer Electronics, Inc., Indianapolis, Ind.

[21] Appl. No.: 669,553

[22] Filed: Mar. 14, 1991

[51] Int. Cl.⁵ .............................................. H01J 29/70
[52] U.S. Cl. .................................... 315/411; 358/190; 358/243
[58] Field of Search ................... 315/411; 358/190, 243

[56] References Cited
U.S. PATENT DOCUMENTS
4,345,275 8/1982 Waybright .
4,389,676 6/1983 Balaban .............................. 358/243

OTHER PUBLICATIONS
U.S. patent application Ser. No. 516,487 in the name of Rodriguez-Cavazos filed Apr. 30, 1990.
A manual entitled, RCA/GE Projection TV Basic Service Data, CTC169, dated 1990, cover page, pp. 1-10 & 2-6.

Primary Examiner—Theodore M. Blum
Attorney, Agent, or Firm—Joseph S. Tripoli; Joseph J. Laks; Sammy S. Henig

[57] ABSTRACT

An ultor voltage power supply includes first and second transformer windings that are coupled in series for producing corresponding first and second flyback pulse voltages. A first protection circuit disables the generation of each of the pulse voltages when the amplitude of the first pulse voltage becomes excessive. A second protection circuit disables the generation of each of the pulse voltages when the amplitude of the second pulse voltage becomes excessive.

19 Claims, 2 Drawing Sheets

HIGH VOLTAGE SHUTDOWN CIRCUIT

This invention relates to a protection circuit of a high voltage power supply of a video apparatus.

In television receiver or monitor circuits, the ultor accelerating potential or high voltage for a picture tube (CRT) is, typically, derived by rectifying a retrace pulse voltage developed in a high voltage winding horizontal output of a flyback transformer that is used for producing an ultor voltage. The retrace pulse voltage is developed by a horizontal deflection circuit output stage that is coupled to the high voltage winding via the primary winding of the flyback transformer. The horizontal deflection circuit output stage comprises a horizontal deflection winding, a retrace capacitor and a trace switch, comprising a damper diode and a horizontal ouput transistor.

In the case of a fault condition, excessive ultor voltage might result. If not prevented, excessive ultor voltage might cause hazardous x-ray radiation to be emitted by the CRT. A typical high voltage shutdown circuit that is employed to prevent excessive ultor voltage detects or senses a horizontal flyback pulse voltage produced across a secondary winding of the horizontal flyback transformer. When such sensed voltage exceeds a threshold, safe level, a shutdown circuit disables switching operation in the horizontal output transistor so as to prevent the generation of the ultor voltage.

In typical televison receiver circuits, raster size is inversely proportional to the square root of the ultor accelerating potential. Because the high voltage circuit exhibits a certain amount of source impedance, increasing the load current drawn from the ultor terminal will result in a decreased ultor accelerating potential. Ultor voltage variations resulting from variation of beam current occur mainly due to a leakage inductance between the high voltage and the primary winding of the flyback transformer. Ultor voltage variations lead to reduced performance. The reduced performance is manifested by undesirable raster size variations, reduced peak brightness at high beam currents.

Because of the advent of, for example, very large picture tubes having increased resolution capability and the advent of high definition television, it may be desirable to have a better stabilized or regulated ultor voltage so as to obtain better display performance over the entire beam current or brightness range. It may be further desirable to have the ultor voltage adjustable to the maximum permissible value, taking into account the x-radiation limit, to obtain high brightness at low beam current and, therefore, a better spot size.

Allowed U.S. patent application Ser. No. 516,487 in the name of Rodriguez-Cavazos, filed Apr. 30, 1990 (the Rodriguez-Cavazos arrangement) discloses a high voltage power supply of a video apparatus. A periodic, resonant first flyback pulse voltage is developed across a high voltage winding of a horizontal flyback transformer. A periodic, resonant second flyback pulse voltage at a controllable amplitude is applied in series with the first flyback pulse voltage. A high voltage pulse, developed from a voltage at a second terminal of the high voltage winding that is used for producing an ultor voltage, has an amplitude that is equal to the sum of the first and second flyback pulse voltages and that varies when the amplitude of the second flyback pulse voltage varies.

In the Rodriguez-Cavazos arrangement, because the first and second flyback pulse voltages are applied in series, the ultor voltage may be excessive, as a result of a fault condition in the second flyback voltage generating arrangement, even though the first pulse voltage that is produced in the the horizontal flyback transformer is at a normal amplitude. Therefore, sensing the flyback pulse voltage that is produced in the horizontal flyback transformer, without taking into account the second flyback pulse voltage, may not be adequate. It may be desirable to detect a fault condition also in the second flyback pulse voltage generating arrangement. Also, when the second switching arrangement is formed by an MOSFET transistor, it may be desirable to protect the MOSFET transistor against excessive flyback pulse voltage that is developed at its drain electrode, during flyback.

A high voltage power supply of a video apparatus, embodying an aspect of the invention, includes an arrangement for developing a resonant, first flyback pulse voltage across a high voltage winding of a flyback transformer. A resonant, second flyback pulse voltage is generated and combined with the first flyback pulse voltage to produce a high voltage pulse that is coupled to an electrode of a cathode ray tube. A first protection circuit responsive to the second flyback pulse voltage and coupled to one of the first and second flyback pulse voltage generating means disables the generation of one of the first and second flyback pulse voltages when an amplitude of the second flyback pulse voltage is not within a normal operation range. A second protection circuit responsive to the first flyback pulse voltage and coupled to one of the first and second flyback pulse voltage generating means disables the generation of one of the first and second flyback pulse voltages when an amplitude of the first flyback pulse voltage is outside a second normal operation range.

Figure 1B:
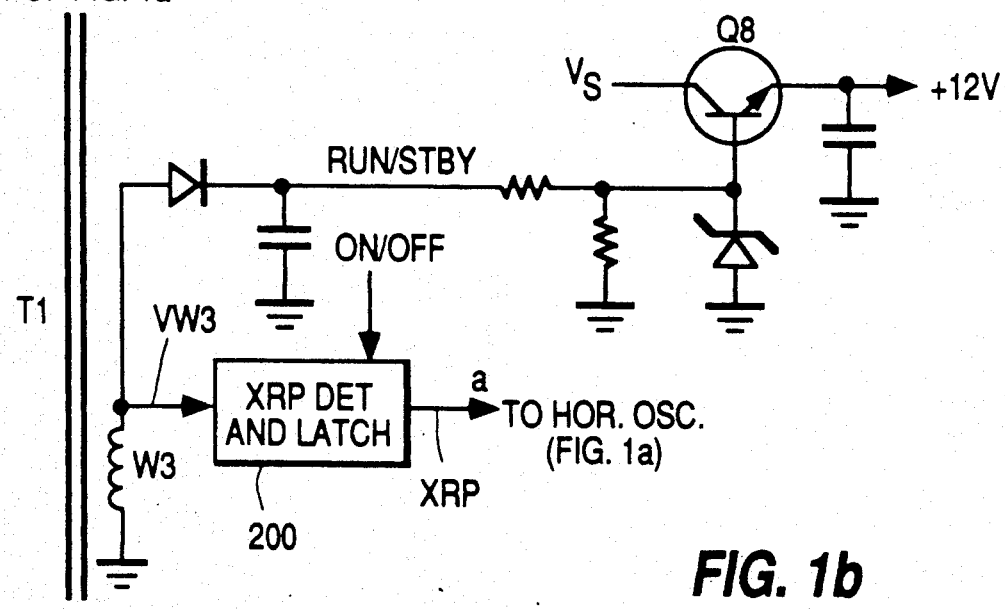

The FIGS. 1a and 1b illustrate a horizontal deflection circuit with ultor voltage stabilization that includes a protection arrangement, embodying an aspect of the invention.

The figures illustrate a horizontal deflection circuit 100, a high voltage stabilization circuit 102 and a shutdown or protection circuit 110, embodying an aspect of the invention of, for example, a television receiver. Circuit 102 generates a stabilized ultor voltage U. For simplicity, east-west raster correction, horizontal linearity correction and component values, which are not relevant for explaining the invention, are omitted from the figures.

High voltage stabilization circuit 102 includes a switching transistor Q2, responsive to a horizontal rate drive signal HORDRIVE at a horizontal frequency $2 \times f_H$, where $f_H$ is approximately 16 KHZ in the NTSC standard, a retrace capacitor C3 and a primary winding Wa of a transformer T2. Transformer T2 has a secondary winding Wb for developing a flyback voltage V3 between terminals A and B. Winding Wb is coupled at terminal B in series with a tertiary, high voltage winding W2 of a flyback transformer T1. Winding W2 is formed by multiple winding segments that are coupled in series via diodes D3 that form a split diode arrangement, in a well known manner.

A switching transistor Q1 of deflection circuit 100, also responsive to horizontal rate drive signal HORDRIVE, generates a horizontal rate flyback or retrace voltage V1 in a deflection retrace or flyback resonant circuit 79 that is coupled via a primary winding W1 of transformer T1 to winding W2 to form a horizontal rate retrace or flyback high voltage V2 in winding W2. Winding W1 is coupled to a supply voltage B+. High voltage V2 is equal to the sum of the retrace pulse voltages in each of the four winding segments of winding W2. The waveform of voltage V2 that is shown in FIG. 1a would have been obtained across winding W2 had a diode split arrangement were not utilized but, instead, a rectifying diode had been coupled between an end terminal C of such winding W2 and an ultor electrode ULTOR of the picture tube. Such waveform of voltage V2 is equivalent to a sum of the voltages in the winding segments of winding W2. An ultor voltage U is generated in accordance with a sum of retrace voltage V2 and and flyback voltage V3. For example, the peak amplitude of voltage V2 is 31.5 KV and that of voltage V3 is 1.6 KV.

A beam current sampling resistor R3 and a capacitor C2 that are coupled in parallel are coupled between terminal A of winding Wb and ground. Consequently, a beam current dependent negative voltage $V_{BC}$ is developed across resistor R3 at terminal A which serves to lower the settings of brightness or contrast or both at excessive average beam currents. Voltage $V_{BC}$ at terminal A has no appreciable influence on stabilization circuit 102 and, therefore, is not referred to in the description that follows.

Stabilization circuit 102 operates as an energy flywheel. When transistor Q2 is conductive, an increasing ramp current $i_1$ flows through winding Wa and stores energy in winding Wa. When transistor Q2 is switched off, the stored energy is transferred into retrace capacitor C3 and develops a retrace voltage V4 across capacitor C3 and across winding Wa that forms with capacitor C3 a flyback resonant circuit 78. Voltage V4 is transformer coupled to winding Wb and appears as flyback voltage V3 across winding Wb that is in series with retrace voltage V2. A flyback interval $t_a$ of voltage V3 is substantially longer than a deflection retrace interval $t_r$ of voltage V2. For example, the deflection retrace time $t_r$ may be 5.7 microseconds. In contrast, the flyback interval $t_a$ of voltage V3 may be 11 microseconds.

Signal HORDRIVE is coupled to a gate electrode of transistor Q2 via an inverter stage that includes a transistor Q3, a resistor R61 and a capacitor C60. A current source that includes a transistor Q7 has a collector electrode that is coupled to the collector electrode of transistor Q3 to provide transistor Q3 collector current. The emitter of transistor Q7 is coupled to a supply voltage of +12 V via an emitter resistor 206. The base voltage of transistor Q7 is determined by a voltage divider that is formed by a resistor 207 and a resistor 208, coupled in series between the supply voltage of +12 V and ground. A diode D102 clamps the switching gate electrode voltage of transistor Q2 to −0.7 volts when transistor Q3 is turned on. Because of the storage time in transistor Q1, the leading edge of the flyback pulse of voltage V3 will occur substantially earlier than that of voltage V2. Therefore, the entire pulse of voltage V2 will occur during the peak, flat portion of the wide pulse of voltage V3. The peak portion of the pulse of pulse voltage V3 is relatively "flat" when the peak of the pulse of voltage V2 occurs.

A control circuit 103 of circuit 102 provides an energizing DC voltage $V_{CONT}$ that controls the amplitude of pulse voltages V4 and V3. The level of voltage $V_{CONT}$ varies in accordance with a current $i_2$ that flows in a bleeder resistor R2 that is indicative of the level of ultor voltage U. Ultor voltage U is proportional to the peak value of the sum of retrace voltages V2 and V3. That peak voltage is controlled by control circuit 103. Ultor voltage U is held constant by a negative feedback loop of control circuit 103.

Control circuit 103 includes a differential amplifier 104 operating as an error amplifier and having an inverting terminal that is coupled to a reference voltage VZ developed in a zener diode Z. A noninverting input terminal of amplifier 104 is coupled to a low end of bleeder resistor R2 via an adjustable resistor R63 that is used for adjusting ultor voltage U. An output terminal of amplifier 104 is coupled via a diode D104 of a voltage clamping arrangement, embodying an inventive feature, and via a signal inverting stage 64 that includes a transistor Q4 and resistors R65, R66, R67 and R68. The collector of transistor Q4 is coupled to the base electrodes of transistors Q5 and Q6 operating in a push-pull manner as emitter followers. The collector electrode of transistor Q5 is coupled to supply voltage B+. Voltage $V_{CONT}$ is developed at a junction terminal 69 between the emitters of transistors Q5 and Q6. A filter capacitor C70 is coupled between terminal 69 and ground. A change in ultor voltage U will produce a corresponding change in voltage $V_{CONT}$ in a negative feedback manner to vary the peak amplitude of voltage V3 that stabilizes ultor voltage U.

Assume that due to a fault condition, the output voltage of amplifier 104, developed at the anode of diode D104, drops in a manner to cause a drop in the base voltage of transistor Q4 below a minimum level. In accordance with an inventive feature, a diode D105 couples a DC voltage developed in a voltage divider that includes a resistor R105 and a resistor R106 to the base electrode of transistor Q4. The voltage coupled via diode D105 clamps or maintains the base voltage of transistor Q4 above the predetermined minimum level. The voltage that is coupled via diode D105 prevents control voltage $V_{CONT}$ from exceeding a corresponding predetermined maximum level of, for example, 105 volts, irrespective of the drop in the magnitude of the output voltage at the output terminal of amplifier 104. Advantageously, by preventing voltage $V_{CONT}$ from exceeding the predetermined maximum level, MOSFET transistor Q2 is protected against excessive peak voltage at its drain electrode, during flyback.

An X-ray or a high voltage protection circuit 200 is responsive to a retrace pulse voltage VW3 of transformer T1, developed across a secondary flyback transformer winding W3, for generating a conventional disabling or shutdown control signal XRP when voltage VW3 exceeds a predetermined threshold level. Voltage VW3 is representative of the flyback pulse voltage that is produced in each winding segment W2. Signal XRP is coupled to a switching arrangement, not shown in detail, of a stage 201 containing a horizontal oscillator that generates signal HORDRIVE.

When signal XRP is generated, signal HORDRIVE is disabled and the generation of the retrace pulse voltages in winding segments W2 and in winding Wb ceases. Circuit 200 includes a latch that maintains signal XRP at its state that disables the generation of signal HORDRIVE indefinitely or until, for example, the user turns off the power to the television receiver. In normal operation, when the user initiates a power on operation, a signal ON/OFF that is coupled to stage 201 enables the generation of signal HORDRIVE. When the user initiates a power-off operation, signal HORDRIVE is disabled.

The amplitude of voltage VW3 is not necessarily related to the amplitude of pulse voltage V3 in winding Wb of transformer T2. Assume that voltage VW3 is smaller than the threshold voltage of circuit 200 so that circuit 200 does not disable signal HORDRIVE. However, a fault condition may occur in which pulse voltage V3 may be sufficiently large to produce ultor voltage U at a level that exceeds the safe level.

It may be desirable to disable the generation of signal HORDRIVE so as to cause a shutdown condition in circuit 102 in a manner to disable the generation of pulse voltage V3 when the amplitude of voltage V3 exceed a predetermined magnitude. Thus, a fault condition in stabilization circuit 102 will result in a shutdown condition in circuit 102 in a manner to prevent ultor voltage U from exceeding the safe level even when the pulse voltage VW3 is smaller than the threshold level of protection circuit 200. Preventing the amplitude of voltage V3 from exceeding the predetermined magnitude also protects MOSFET transistor Q2 against excessive high peak voltage, as indicated before.

In a protection circuit 110, embodying an aspect of the invention, Voltage $V_{CONT}$ that controls the amplitude of pulse voltage V3 is coupled via a voltage divider that includes a resistor 202 and a resistor 203 to a cathode of a zener diode Z10V having a zener voltage of 10 volts. The anode of zener diode Z10V is coupled to a gate electrode of a silicon controlled rectifier (SCR) 204. SCR 204 is turned-on in a latching mode when voltage $V_{CONT}$ exceeds a predetermined level such as, for example, +115 volts that is determined by resistors 202 and 203 and zener diode Z10V. When the voltage at a terminal 202a, between resistors 202 and 203, exceeds the zener voltage of +10 volts, SCR 204 is turned on in a latched mode.

The cathode of SCR 204 is coupled to ground. The anode of SCR 204 is coupled via a diode 205 to the collector of transistor Q3. The anode of SCR 204 is also coupled between the emitter of transistor Q7 and resistor 206. When SCR 204 is turned-on, as a result of excessive level of voltage $V_{CONT}$, the collector current of current source transistor Q7 is shunted away from the collector of transistor Q3 and the collector voltage of transistor Q3 is maintained indefinitely at approximately zero volts. Therefore, switching operation in transistor Q2 ceases and the generation of pulse voltage V3 is, advantageously, disabled. Thus, excessive level of ultor voltage U and a possible damage to MOSFET transistor Q2 are prevented. The generation of pulse voltage V3 is disabled when voltage $V_{CONT}$ is at +115 volts that is larger than the +105 volt limit, established by the clamping operation of diodes D104 and D105. Thus, abnormal operation condition in an output stage of control circuit 103 that includes transistor Q4 and Q5 would disable the generation of voltage V3.

SCR 204 is maintained in the latched mode by the holding current that flows via resistor 206 indefinitely or until the user turns off the power to the television receiver. When the user turns off the power to the television receiver, the +12V voltage becomes zero and the latched mode operation in SCR 204 ceases.

In normal operation, after the user initiates the power-on operation, switching operation begins in transistor Q1 as a result of signal HORDRIVE being enabled. Voltage VW3 in winding W3 is then produced and rectified to produce a signal RUN/STBY at a "RUN" state that is coupled to a based electrode of a power supply output transistor Q8. The collector of transistor Q8 is energized both during standby, or power off and during run mode. Consequently, when voltage VW3 is generated, the +12V voltage is developed at the emitter of transistor Q8. On the other hand, during standby, transistor Q8 is turned off by signal RUN/STBY at an "STBY" state causing the +12V voltage to be zero. As long as the +12V voltage is zero, the cathode of zener diode Z10V is clamped to approximately zero volts by the operation of a diode 220 that is coupled between terminal 202a and the +12V voltage.

Immediately after the user initiates the power-on operation, control circuit 103 might produce, in a transient condition, control voltage $V_{CONT}$ at a high level that might have caused SCR 204, undesirably, to turn-on and be maintained indefinitely in the latched mode. The transient high level of voltage $V_{CONT}$ may initially occur because, prior to steady state operation, the voltage at the noninverting input terminal of amplifier 104 is zero.

In accordance with an inventive feature, to prevent SCR 204 from turning on each time the user initiates power-on operation, the clamping operation of diode 220 and in conjunction with a delaying operation of a capacitor 222 that is coupled to the gate of SCR 204 disable SCR 204 from being turned during an interval that immediately follows the initiation of power on operation. After control circuit 103 begins operating in a steady state mode, diode 220 and capacitor 222 no longer prevent the latching operation in SCR 204.

What is claimed is:

1. A high voltage power supply of a video apparatus, comprising:
    a source of an input signal at a first frequency;
    a first flyback resonant circuit including a deflection winding;
    first switching means responsive to said input signal and coupled to said first flyback resonant circuit for generating a resonant, first flyback pulse voltage at a frequency that is related to said first frequency that is developed across as high voltage winding of a flyback transformer;
    a second flyback resonant circuit;
    second switching means responsive to said input signal and coupled to said second flyback resonant circuit for generating a resonant, second flyback pulse voltage at a frequency that is related to said first frequency, said second flyback pulse voltage being combined with said first flyback pulse voltage to produce a high voltage pulse that is coupled to an electrode of a cathode ray tube;
    a control circuit coupled to said second flyback pulse voltage generating means for controlling said second flyback pulse voltage in a manner that varies said high voltage pulse; and
    a first protection circuit responsive to said controlled second flyback pulse voltage and coupled to said second flyback pulse voltage generating means for disabling the generation of said second flyback pulse voltage when said second flyback pulse voltage is outside a normal operation range.

2. A power supply according to claim 1 wherein said first and second flyback pulse voltages are applied in series to produce said high voltage pulse.

3. A power supply according to claim 2 further comprising, second protection circuit responsive to first and second flyback voltage generating means for disabling the generation of one of said first and second flyback pulse voltages when an amplitude of said first flyback pulse voltage is not within a corresponding normal operation range.

4. A power supply according to claim 2 wherein said first protection circuit includes a latch that continues to disable the generation of said second flyback pulse voltage after the generation of said second flyback pulse voltage is initially disabled.

5. A power supply according to claim 2 wherein said control circuit comprises means for generating a control voltage that is coupled to said second flyback resonant circuit and that is developed at an input terminal of said first protection circuit, wherein said first protection circuit disables the generation of said second flyback pulse voltage when said control voltage is outside a normal operation range.

6. A power supply according to claim 5 wherein said first protection circuit comprises means responsive to said control voltage and coupled to a gate electrode of a silicon controlled rectifier for turning-on said silicon control rectifier in a latching manner when said control voltage is not within said corresponding normal operation range.

7. A power supply according to claim 5 wherein said control circuit further comprises, means for clamping said control voltage to prevent said magnitude of said second flyback pulse voltage from becoming excessive.

8. A power supply according to claim 2 wherein said first protection circuit disables the generation of said second flyback pulse voltage when said amplitude of said second flyback pulse voltage becomes excessive.

9. A high voltage power supply according to claim 1 further comprising, rectifier means coupled to said high voltage winding for generating a rectified high voltage that is coupled to an ultor electrode of said cathode ray tube wherein said control circuit is responsive to said rectified high voltage for varying said second flyback voltage pulse in a negative feedback manner when said ultor voltage varies to stabilize said rectified high voltage.

10. A high voltage power supply according to claim 1 wherein said deflection winding comprises a horizontal deflection winding.

11. A high voltage power supply according to claim 1 wherein said flyback transformer comprises a primary winding that is coupled to said first flyback resonant circuit and wherein said high voltage winding comprises a tertiary winding of said flyback transformer.

12. A power supply according to claim 1 wherein said first and second flyback pulse voltages are produced in windings that are magnetically separated and wherein said amplitude of high voltage pulse is equal to said sum of said first and second flyback pulse voltage.

13. A power supply according to claim 1 wherein said high voltage winding of said first flyback transformer is magnetically coupled to said first flyback resonant circuit, wherein a winding of a second flyback transformer is magnetically coupled to said second flyback resonant circuit and wherein said windings of said first and second flyback transformers are coupled in series to produce at a terminal of one of said windings said high voltage pulse that is coupled to an input terminal of a high voltage rectifier for generating a rectified high voltage at an output terminal of said rectifier.

14. A power supply according to claim 1 wherein said second switching means comprises a switching transistor and wherein first protection circuit disables the generation of said second flyback pulse voltage in a manner to protect said transistor against excessive voltage developed between a pair of main current conducting terminals thereof when said switching transistor becomes nonconductive.

15. A power supply according to claim 1 wherein said control circuit comprises an error amplifier, an output stage having an input that is coupled to an out put of said error amplifier and an output that is coupled to said second flyback resonant circuit and means for clamping a signal that is developed in a signal path between said amplifier and output stage to prevent said amplitude of said second flyback pulse voltage from exceeding a first magnitude.

16. A power supply according to claim 15 wherein said first protection circuit disables the generation of said second flyback pulse voltage when said amplitude of said second flyback pulse voltage exceeds a second magnitude that is greater than said first magnitude.

17. A high voltage power supply of a video apparatus, comprising;
 a source of an input signal at a frequency that is related to a deflection frequency;
 a first flyback resonant circuit that includes a deflection winding;
 first switching means responsive to said input signal and coupled to said first flyback resonant circuit for generating a resonant, first flyback pulse voltage at a frequency that is related to a deflection frequency that is developed across a high voltage winding of a flyback transformer;
 a second flyback resonant circuit;
 second switching means responsive to said input signal and coupled to said second flyback resonant circuit for generating a resonant, second flyback pulse voltage at a frequency that is voltage being applied in series with said first flyback pulse voltage to produce a high voltage pulse that is coupled to an electrode of a cathode ray tube having an amplitude that is in accordance with a sum of said first and second flyback pulse voltages;
 a control circuit responsive to said high voltage pulse and coupled to one of said first and second flyback pulse voltage generating means for controlling one of said first and second flyback pulse voltages in a manner that varies said amplitude of said high voltage pulse;
 a first protection circuit responsive to said second flyback pulse voltage and coupled to one of said first and second flyback pulse voltage generating means for disabling the generation of one of said first and second flyback pulse voltages when an amplitude of said second flyback pulse voltage is not within a first normal operation range; and
 a second protection circuit responsive to said first flyback pulse voltage and coupled to one of said first and second flyback pulse voltage generating means for disabling the generation of one of said first and second flyback pulse voltages when an amplitude of said first flyback pulse voltage is not within a second normal operation range.

18. A high voltage power supply of a video apparatus, comprising:
 . a source of an input signal at a first frequency;
 a first flyback resonant circuit including a deflection winding;
 first switching means responsive to said input signal and coupled to said first flyback resonant circuit for generating a resonant, first flyback pulse voltage at a frequency that is related to said first frequency that is developed across a high voltage winding of a flyback transformer;

a second flyback resonant circuit;

second switching means responsive to said input signal and coupled to said second flyback resonant circuit for generating a resonant, second flyback pulse voltage at a frequency that is related to said first frequency, said second flyback pulse voltage being combined with said first flyback pulse voltage to produce a high voltage pulse that is coupled to an electrode of a cathode ray tube; and a control circuit coupled to said second flyback pulse voltage generating means for controlling said second flyback pulse voltage in a manner that varies said high voltage pulse, said control circuit comprising an error amplifier, an output stage having an input that is coupled to an output of said error amplifier and an output that is coupled to said second flyback resonant circuit and means for clamping a signal that is developed in a signal path between said amplifier and output stage to prevent said amplitude of said second flyback pulse voltage from exceeding a first magnitude.

19. A high voltage power supply of a video apparatus, comprising;

a source of an input signal at a first frequency;

a first flyback resonant circuit;

first switching means responsive to said input signal and coupled to said first flyback resonant circuit for generating a resonant, first flyback pulse voltage at a frequency that is related to said first frequency that is developed across a high voltage winding of a flyback transformer;

a second flyback resonant circuit;

second switching means responsive to said input signal and coupled to said second flyback resonant circuit for generating a resonant, second flyback pulse voltage at a frequency that is related to said first frequency, said second flyback pulse voltage being combined with said first flyback pulse voltage to produce a high voltage pulse that is coupled to an electrode of a cathode ray tube;

a control circuit responsive to said high voltage pulse and coupled to said second flyback pulse voltage generating means for controlling said second flyback pulse voltage in a manner that varies said high voltage pulse; and a first protection circuit responsive to said controlled second flyback pulse voltage and coupled to said second flyback pulse voltage generating means for disabling the generation of said second flyback pulse voltage when said second flyback pulse voltage is outside a normal operation range.

* * * * *